United States Patent
Blumenau et al.

(10) Patent No.: US 6,449,652 B1
(45) Date of Patent: Sep. 10, 2002

(54) METHOD AND APPARATUS FOR PROVIDING SECURE ACCESS TO A COMPUTER SYSTEM RESOURCE

(75) Inventors: Steven M. Blumenau, Holliston; Christopher J. Hackett, Boylston; Matthew J. D'Errico, Southboro, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/224,789

(22) Filed: Jan. 4, 1999

(51) Int. Cl.$^7$ ............................................. G06F 15/16
(52) U.S. Cl. .................................. 709/229; 711/164
(58) Field of Search ............................. 707/9, 10, 103; 709/226, 229; 713/200, 201; 711/112, 163, 170, 164, 167; 345/340

(56) References Cited

U.S. PATENT DOCUMENTS

| | | | |
|---|---|---|---|
| 5,335,346 A | * 8/1994 | Fabbio | 711/163 |
| 5,423,034 A | * 6/1995 | Cohen-Levy et al. | 707/10 |
| 5,675,782 A | * 10/1997 | Montague et al. | 713/201 |
| 5,708,832 A | * 1/1998 | Inniss et al. | 709/229 |
| 5,761,669 A | * 6/1998 | Montague et al. | 707/103 |
| 5,787,427 A | * 7/1998 | Benantar et al. | 707/9 |
| 5,897,661 A | * 4/1999 | Baranovsky et al. | 711/170 |
| 5,925,126 A | * 7/1999 | Hsieh | 713/200 |
| 5,973,690 A | * 10/1999 | Ofer et al. | 345/340 |
| 5,983,316 A | * 11/1999 | Norwood | 711/112 |
| 6,038,563 A | * 3/2000 | Bapat et al. | 707/10 |
| 6,216,202 B1 | * 4/2001 | D'Errico | 711/112 |
| 6,263,445 B1 | * 7/2001 | Blumenau | 713/201 |
| 6,282,602 B1 | * 8/2001 | Blumenau et al. | 711/111 |

* cited by examiner

*Primary Examiner*—Patrice Winder
(74) *Attorney, Agent, or Firm*—Wolf, Greenfield & Sacks, P.C.

(57) ABSTRACT

Method and apparatus for managing access to one of a plurality of raw storage devices in a computer system including a host computer and a storage system that is coupled to the host computer and that stores data accessed by the host computer. The computer system includes a plurality of logical volumes of data that are visible to the host computer and the storage system and are perceived by the host computer as comprising the plurality of raw storage devices. In accordance with one aspect of the invention, a request to perform an action on the one of the plurality of raw storage devices can be granted, even when the requester has less than system administrator access privileges. In accordance with another aspect of the invention, the one of the plurality of raw storage devices may have associated access privileges information. The access privileges information associated with the one of the plurality of raw storage devices may be compared with information descriptive of the requester, and the request may be granted when the access privileges information associated with the one of the plurality of raw storage devices indicates that the requester is privileged to perform the action on the one of the plurality of raw storage devices.

66 Claims, 7 Drawing Sheets

METHOD AND APPARATUS FOR PROVIDING SECURE ACCESS TO A COMPUTER SYSTEM RESOURCE

FIELD OF THE INVENTION

The present invention is directed to a method and apparatus for providing secure access to a computer system resource such as a storage device.

DESCRIPTION OF THE RELATED ART

Many computer systems include one or more host computers and one or more storage systems that store data used by the host computers. An example of such a system is shown in FIG. 1, and includes a host computer 1 and a storage system 3. The storage system typically includes a plurality of storage devices on which data are stored. In the exemplary system shown in FIG. 1, the storage system 3 includes a plurality of disk drives 5a–5b, and a plurality of disk controllers 7a–7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data are stored in the cache), rather than from one of the disk drives 5a–5b, to execute the read more efficiently. Similarly, when the host computer 1 executes a write to the storage system 3, the corresponding storage bus director 9 may execute the write to the cache 11. Thereafter, the write can be destaged asynchronously, in a manner transparent to the host computer 1, to the appropriate one of the disk drives 5a–5b. Finally, the storage system 3 includes an internal bus 13 over which the storage bus directors 9, disk controllers 7a–7b, and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each being a SCSI driver. Alternatively, communication between the host computer 1 and the storage system 3 can be performed over a Fibre Channel fabric.

As shown in the exemplary system of FIG. 1, some computer systems employ multiple paths for communicating between the host computer 1 and the storage system 3 (e.g., each path includes a host bus adapter 15, a bus 17 and a storage bus director 9 in FIG. 1). In many such systems, each of the host bus adapters 15 has the ability to access each of the disk drives 5a–b, through the appropriate storage bus director 9 and disk controller 7a–b. It should be appreciated that providing such multi-path capabilities enhances system performance, in that multiple communication operations between the host computer 1 and the storage system 3 can be performed simultaneously.

FIG. 2 is a schematic representation of a number of mapping layers that may exist in a known computer system such as the one shown in FIG. 1. The mapping layers include an application layer 21 which includes application programs executing on the processor 16 of the host computer 1. As used herein, "application program" is not limited to any particular implementation, and includes any kind of program or process executable by one or more computer processors, whether implemented in hardware, software, firmware, or combinations of them. The application layer 21 will generally refer to storage locations used thereby with a label or identifier such as a file name, and will have no knowledge about where the corresponding file is physically stored on the storage system 3 (FIG. 1). Below the application layer 21 is a file system and/or a logical volume manager (LVM) 23 that maps the label or identifier specified by the application layer 21 to a logical volume that the host computer 1 perceives to correspond directly to a physical device address (e.g., the address of one of the disk drives 5a–b) within the storage system 3. Below the file system/LVM layer 23 is a multi-path mapping layer 25 that maps the logical volume address specified by the file system/LVM layer 23, through a particular one of the multiple system paths, to the logical volume address to be presented to the storage system 3. Thus, the multi-path mapping layer 25 not only specifies a particular logical volume address, but also specifies a particular one of the multiple system paths to access the specified logical volume.

If the storage system 3 were not an intelligent storage system, the logical volume address specified by the multi-pathing layer 25 would identify a particular raw physical device (e.g., one of disk drives 5a–b) within the storage system 3. However, for an intelligent storage system such as that shown in FIG. 1, the storage system itself may include a further mapping layer 27, such that the logical volume address passed from the host computer 1 may not correspond directly to an actual physical device (e.g., a disk drive 5a–b) on the storage system 3. Rather, a logical volume specified by the host computer 1 can be spread across multiple physical storage devices (e.g., disk drives 5a–b), or multiple logical volumes accessed by the host computer 1 can be stored on a single physical storage device.

Some operating systems require that users have appropriate access privileges to access and modify files in various ways. For example, Unix operating systems such as Sun Solaris and IBM AIX associate with each file a filename, an owner (i.e., an identifier of the user or application who created the file), and access privileges information which identifies the operations that different users are allowed to perform on the file. The access privileges information specifies, for example, whether a user is allowed to read, write, or execute the file, or any combination thereof. The access privileges information includes access privileges information for the owner of the file, for specified groups of users, and for all other users (referred to as "world" access privileges). For example, the access privileges information for a file may indicate that the owner of the file may read, write, and execute the file, that a specified group of users may read and write the file, and that the world (i.e., all other users) may only read the file. Many operating systems allow a user with system administrator privileges (e.g., a user with the login name "root" in Unix) to perform any operation on any file.

Each request sent to the file system/LVM mapping layer 23 to access a file maintained by the mapping layer contains information identifying the file to be accessed, the identity of the application program making the request (which may, for example, be derived from the identity of the user who executed the application program), and the action desired to be performed on the file. In the case of a request to open a file maintained by a file system within mapping layer 23, the file system compares the information contained in the request to the access privileges information associated with the file to determine whether to grant the request. If, for example, the owner of a file requests to open the file for writing and the file's access privileges information indicates that the owner of the file has write access to the file, then the file system opens the file for writing. If, however, a user who only has "world" access privileges to a file requests to open the file for writing and the "world" access privileges information for the file indicates that such a user may only read from the file, the user's request to open the file for writing is denied.

In most computer systems, a logical volume can be accessed as a "raw" storage device without using the file system/LVM mapping layer 23 to access raw data stored on the logical volume. Some operating systems associate access privileges information, such as that described above, with raw storage devices. A request to "open" a raw storage device (i.e., to open a logical channel through which to send data to or receive data from the raw storage device without using the file system/LVM mapping layer 23) for reading or writing contains information identifying the raw storage device to be opened, the identity of the user making the request, and the purpose for which the raw storage device is to be opened (e.g., reading or writing). Some operating systems, however, such as Sun Solaris and IBM AIX, only grant requests from users having system administrator privileges to open raw storage devices, regardless of the user's access privileges and the access privileges information associated with the raw storage device. Requests from users other than users having system administrator privileges are automatically rejected. Similarly, other operating systems, such as Windows NT, do not even maintain access privileges information for raw storage devices and only allow users having system administrator privileges to access raw storage devices. As a result, for almost all operating systems, an application must have system administrator privileges to directly access raw storage devices.

Some application programs have been developed, for execution on a host computer, which read data from and write data to raw devices directly, without passing through the file system/LVM mapping layer 23. Due to the nature of most operating systems, however, it typically is necessary to grant system administrator user privileges to such applications to enable them to have direct access to raw devices. It is undesirable to grant such privileges to application programs because doing so provides the application programs with the ability to perform any operation on all raw devices in the system, without any access restrictions.

It is an object of the present invention to provide a method and apparatus for providing an application program with direct but limited access to raw devices.

SUMMARY OF THE INVENTION

One illustrative embodiment of the invention is directed to a method of managing access to one of a plurality of raw storage devices in a computer system including a host computer and a storage system that is coupled to the host computer and that stores data accessed by the host computer, the computer system including a plurality of logical volumes of data that are visible to the host computer and the storage system and are perceived by the host computer as comprising the plurality of raw storage devices. The method comprises a step of: (A) granting a request, from a requester having less than system administrator access privileges, to perform an action on the one of the plurality of raw storage devices.

Another illustrative embodiment of the invention is directed to a computer readable medium encoded with a program for execution on a host computer in a computer system including the host computer and a storage system that is coupled to the host computer and that stores data accessed by the host computer. The computer system further includes a plurality of logical volumes of data that are visible to the host computer and the storage system and are perceived by the host computer as comprising a plurality of raw storage devices. The program, when executed on the host computer, performs a method of managing access to one of the plurality of raw storage devices, the method comprising a step of: (A) granting a request, from a requester having less than system administrator access privileges, to perform an action on the one of the plurality of raw storage devices.

A further illustrative embodiment of the invention is directed to a host computer for use in a computer system including the host computer and a storage system that is coupled to the host computer and that stores data accessed by the host computer. The computer system further includes a plurality of logical volumes of data that are visible to the host computer and the storage system and are perceived by the host computer as comprising a plurality of raw storage devices. The host computer comprises: a processor, and a memory programmed with an application program that has less than system administrator access privileges, the application program, when executed on the processor, having privileges to access at least one of the plurality of raw storage devices.

Another illustrative embodiment of the invention is directed to a host computer for use in a computer system including the host computer and a storage system that is coupled to the host computer and that stores data accessed by the host computer. The computer system further includes a plurality of logical volumes of data that are visible to the host computer and the storage system and are perceived by the host computer as comprising a plurality of raw storage devices. The host computer comprises at least one controller to manage access to the plurality of raw storage devices, wherein the at least one controller is adapted to grant a request, from a requester having less than system administrator access privileges, to perform an action on one of the plurality of raw storage devices.

Another illustrative embodiment of the invention is directed to a method of responding to a request from a requester to perform an action on one of a plurality of raw storage devices, wherein the one of the plurality of raw storage devices has associated access privileges information, in a computer system including a host computer and a storage system that is coupled to the host computer and that stores data accessed by the host computer. The computer system includes a plurality of logical volumes of data that are visible to the host computer and the storage system and are perceived by the host computer as comprising a plurality of raw storage devices. The method comprises steps of: (A) determining whether the requester is privileged to perform the action on the one of the plurality of raw storage devices by comparing the access privileges information associated with the one of the plurality of raw storage devices with information descriptive of the requester; (B) granting the request to perform the action on the one of the plurality of raw storage devices when it is determined in the step (A) that the requester is privileged to perform the action; and (C) denying the request to perform the action on the one of the plurality of raw storage devices when it is determined in the step (A) that the requester is not privileged to perform the action.

A further illustrative embodiment of the invention is directed to a computer readable medium encoded with a program for execution on a host computer in a computer system including the host computer and a storage system that is coupled to the host computer and that stores data accessed by the host computer. The computer system includes a plurality of logical volumes of data that are visible to the host computer and the storage system and are perceived by the host computer as comprising a plurality of raw storage devices. The program, when executed on the host computer, performs a method of responding to a request from a requester to perform an action on one of the plurality of raw storage devices, wherein the one of the plurality of raw storage devices has associated access privileges information, the method comprising steps of: (A) determining whether the requester is privileged to perform the action on the one of the plurality of raw storage devices by comparing the access privileges information associated with the one of the plurality of raw storage devices with information descriptive of the requester; (B) granting the request to perform the action on the one of the plurality of raw storage devices when it is determined in the step (A) that the requester is privileged to perform the action; and (C) denying the request to perform the action on the one of the plurality of raw storage devices when it is determined in the step (A) that the requester is not privileged to perform the action.

Another illustrative embodiment of the invention is directed to a host computer for use in a computer system including the host computer and a storage system that is coupled to the host computer and that stores data accessed by the host computer. The computer system includes a plurality of logical volumes of data that are visible to the host computer and the storage system and are perceived by the host computer as comprising a plurality of raw storage devices, wherein at least one of the plurality of raw storage devices has associated access privileges information. The host computer comprises: at least one controller to respond to requests from requesters to perform actions on one of the plurality of raw storage devices, wherein the at least one controller is, for each one of the requests, adapted: to determine whether the requester is privileged to perform the action on the one of the plurality of raw storage devices by comparing the access privileges information associated with the one of the plurality of raw storage devices with information descriptive of the requester; to grant the request to perform the action on the one of the plurality of raw storage devices when it is determined that the requester is privileged to perform the action; and to deny the request to perform the action on the one of the plurality of raw storage devices when it is determined that the requester is not privileged to perform the action.

Another illustrative embodiment of the invention is directed to a method of managing access to a plurality of raw storage devices in a computer system including a host computer and a storage system that is coupled to the host computer and that stores data accessed by the host computer. The computer system includes a plurality of logical volumes of data that are visible to the host computer and the storage system and are perceived by the host computer as comprising a plurality of raw storage devices, the host computer having an access facility that grants access to the plurality of raw storage devices and requires a minimum privilege level for a requester to be granted access to one of the plurality of raw storage devices. The method comprises steps of: (A) intercepting requests to access one of the plurality of raw storage devices from requesters that do not satisfy the minimum privilege level required by the access facility to grant access to one of the plurality of raw storage devices; and (B) modifying at least some of the requests intercepted in the step (A) to indicate that the requester satisfies the minimum privilege level to be granted access to one of the plurality of raw storage devices.

Another illustrative embodiment of the invention is directed to a computer readable medium encoded with a program for execution on a host computer in a computer system including the host computer and a storage system that is coupled to the host computer and that stores data accessed by the host computer. The computer system includes a plurality of logical volumes of data that are visible to the host computer and the storage system and are perceived by the host computer as comprising a plurality of raw storage devices, the host computer having an access facility that grants access to the plurality of raw storage devices and requires a minimum privilege level for a requester to be granted access to one of the plurality of raw storage devices. The program, when executed on the host computer, performs a method of managing access to the plurality of raw storage devices, the method comprising steps of: (A) intercepting requests to access one of the plurality of raw storage devices from requesters that do not satisfy the minimum privilege level required by the access facility to grant access to one of the plurality of raw storage devices; and (B) modifying at least some of the requests intercepted in the step (A) to indicate that the requester satisfies the minimum privilege level to be granted access to one of the plurality of raw storage devices.

Another illustrative embodiment of the invention is directed to a host computer for use in a computer system including the host computer and a storage system that is coupled to the host computer and that stores data accessed by the host computer. The computer system includes a plurality of logical volumes of data that are visible to the host computer and the storage system and are perceived by the host computer as comprising a plurality of raw storage devices. The host computer comprises: an access facility that grants access to the plurality of raw storage devices and requires a minimum privilege level for a requester to be granted access to one of the plurality of raw storage devices; and at least one controller that: intercepts requests to access one of the plurality of raw storage devices from requesters that do not satisfy the minimum privilege level required by the access facility to grant access to one of the plurality of raw storage devices; and modifies at least some of the intercepted requests to indicate that the requester satisfies the minimum privilege level to be granted access to one of the plurality of raw storage devices.

DETAILED DESCRIPTION

Figure 1:
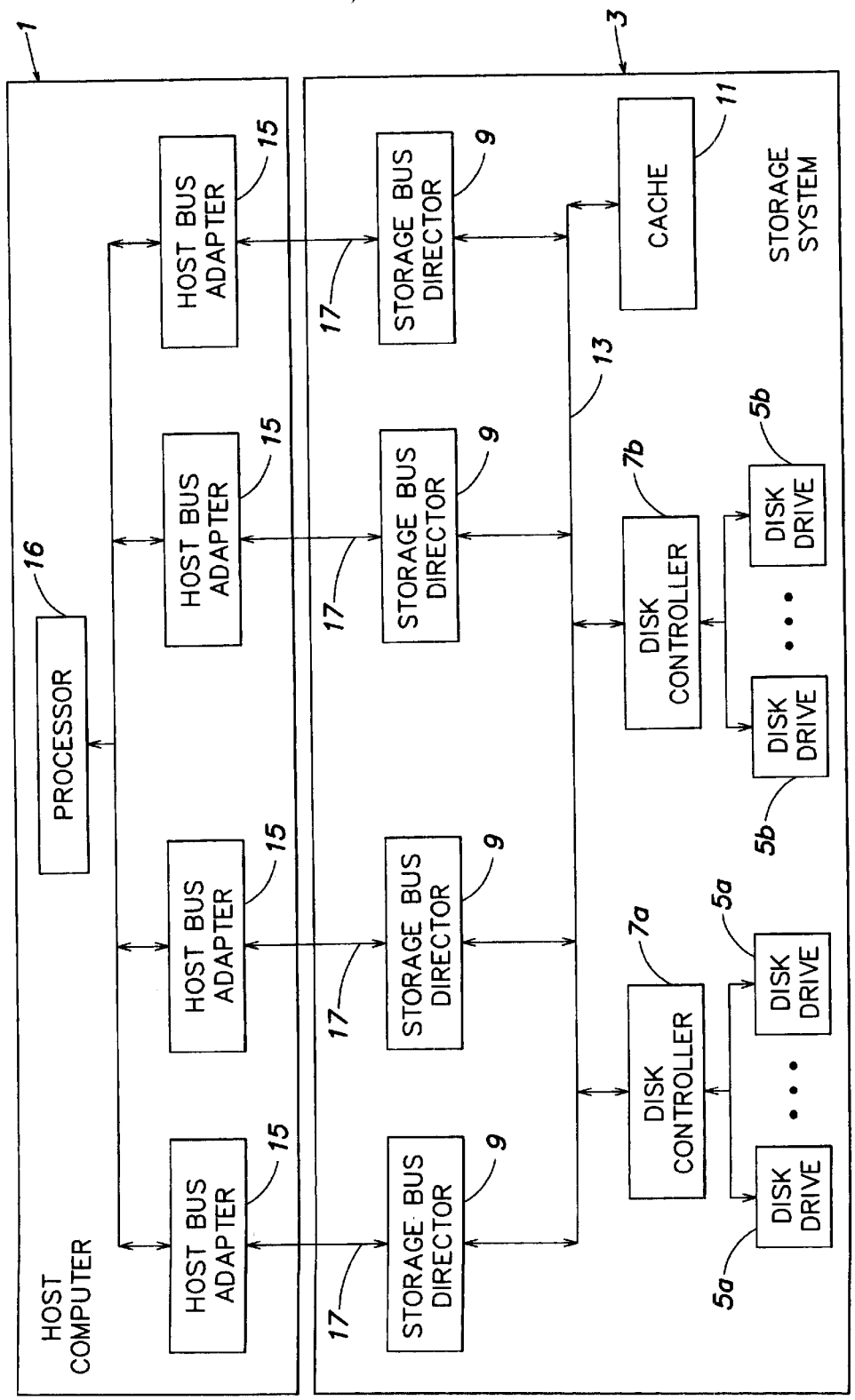
FIG. 1 is a block diagram of an exemplary computing system on which aspects of the present invention can be implemented.

In accordance with one illustrative embodiment of the invention, a method and apparatus is provided to enable an application program to access a raw device, even though the application program does not have system administrator privileges, and executes on a computer system including an O/S that typically requires system administrator privileges to access a raw device. In one embodiment of the invention, access privileges information is associated with the raw devices so that access thereto can be controlled. When an application program requests access to a raw device, information contained within the request (e.g., the kind of access being requested) and information descriptive of the application program making the request (e.g., the identity of the user who executed the application program) are compared to the access privileges information associated with the raw device to determine whether the application program is privileged to access the raw device in the manner requested. When the application program is not so privileged, access to the raw device is denied. However, when the application program is privileged to access the raw device in the manner requested, aspects of the present invention provide such access to the raw device. This can be done in numerous ways.

In accordance with one embodiment of the present invention, when an application requests access to a raw device in a manner authorized by the privileges information associated with the raw device, the request is passed to a component of the host computer (e.g., a disk driver) which is responsible for processing requests for access to a raw device. The request passed to the disk driver is formatted to appear as though the request was issued by a user having system administrator privileges (e.g., the root user), who is recognized by the operating system as being privileged to access the raw device in the manner requested. Thus, the request for access is granted by the disk driver.

It should be appreciated that the above-described embodiment of the present invention is advantageous in that it enables application programs to access raw devices without requiring that the applications be given system administrator privileges. In this manner, the privileges granted to any particular application program can be controlled, such that an application program can be restricted in the raw devices for which access is granted, as well as for the types of operations (e.g., read or write) that it can perform to particular raw devices.

It should be appreciated that the above-described embodiment of the present invention can be implemented in any of numerous ways, and that the present invention is not limited to any particular implementation technique. For example, in one embodiment of the invention, the host computer on which the application program runs is provided with a security driver that intercepts any request from an application program to access a raw device. The security driver determines whether the request should be granted by comparing information contained within the request, along with information descriptive of the identity of the requester, to access privileges information associated with the raw device. If the comparison reveals that the application program has appropriate access privileges to access the raw device, the driver modifies the request to indicate that it was received from a user having system administrator privileges. The driver then forwards the modified request to the disk driver that is normally used to process access requests for the raw device, thereby enabling the application program to access the raw device.

Some operating systems already store and maintain access privileges information for raw storage devices. Thus, when used in conjunction with such operating systems, the above-described embodiment of the present invention is advantageous in that separate storage and maintenance of raw storage device access privileges information is not required, and standard operating system routines can be used to manipulate raw storage device access privileges information. Furthermore, because the security driver performs the same kinds of security checks for raw storage devices as those currently performed for files, the security driver is likely to meet most users' expectations about what kinds of security features should be associated with raw storage devices.

As should be appreciated from the foregoing, by intercepting standard operating system procedure calls (e.g., "open disk") directed to a raw device, the above-described embodiments allow verification of raw storage device access privileges to occur transparently. In other words, when an application issues an "open disk" request, the request is intercepted without the knowledge of the requesting application, and the request is either accepted or denied without any indication to the application that the request was intercepted. Thus, existing applications do not require any modification to work in conjunction with this illustrative embodiment of the present invention.

It should be appreciated from the foregoing that the above-described embodiments of the present invention provide system administrators with significant flexibility and control over access to raw storage devices, by allowing system administrators to specify the ways in which raw storage devices may be accessed by individual users, by specified groups of users, or by all users. This is particularly advantageous, for example, in situations where it is necessary to allow certain specified users to directly access data stored on raw storage devices and to prevent other users from accessing any raw storage device data at all. In this way, access to raw storage devices may be restricted to certain trusted users, thereby reducing the risk of security breaches.

The present invention can be implemented in any of numerous ways, and is limited neither to any particular manner of implementation nor to use with any particular type of operating system. One implementation is described below solely for illustrative purposes. It should be appreciated that numerous alternate implementations are possible.

Figure 2:
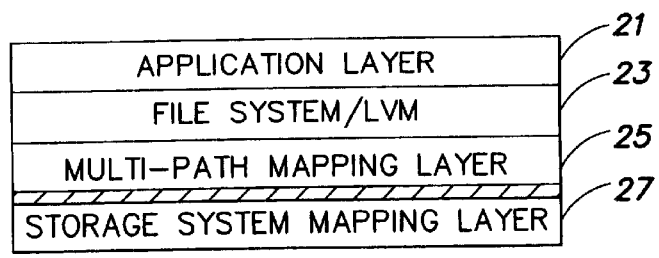
FIG. 2 is a schematic representation of a number of mapping layers that exist in a known computing system.
Figure 3:
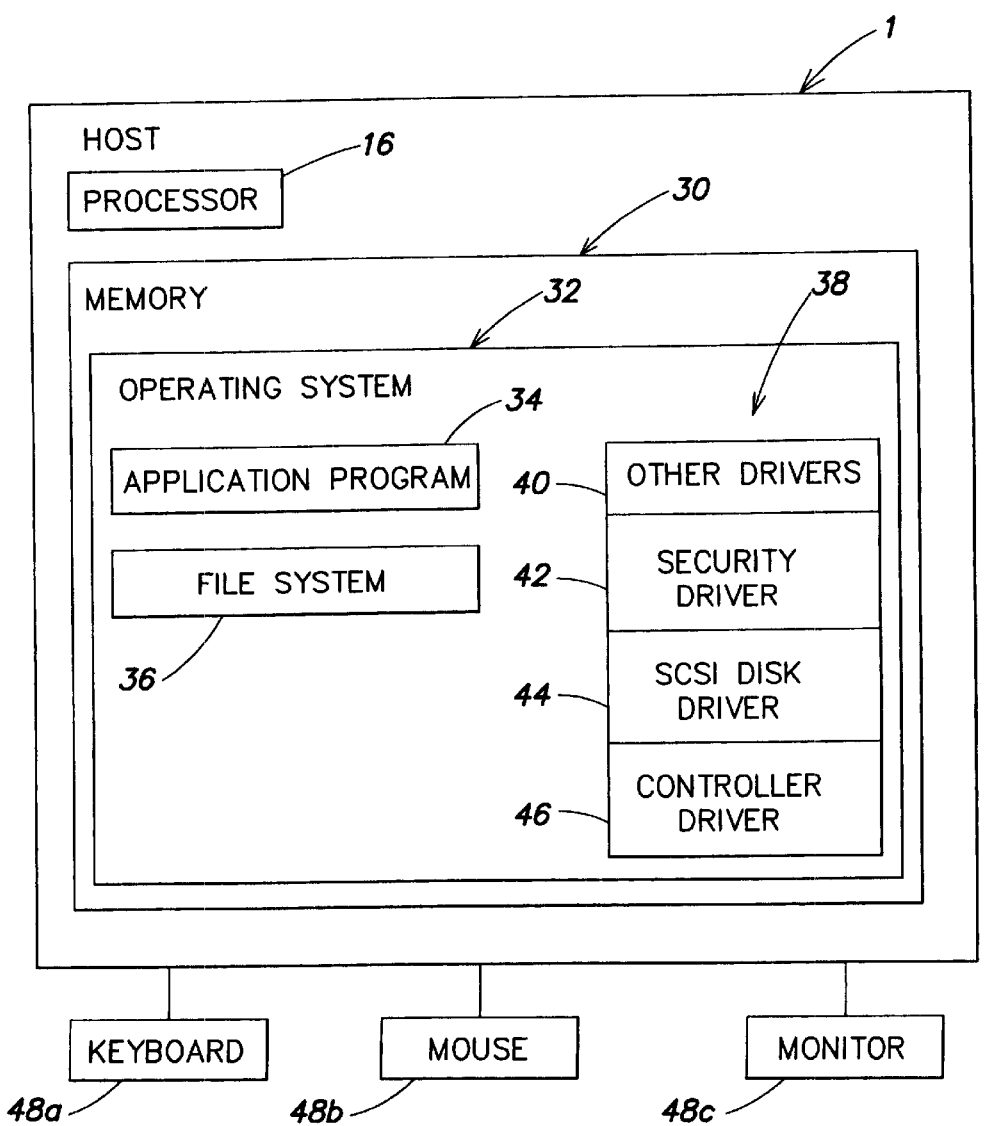
FIG. 3 is a block diagram of a host computer including a security driver for providing secure access to a computer system resource such as a storage device.

FIG. 3 illustrates a number of software components loaded onto a memory 30 in the host computer 1 (FIG. 1). An operating system 32 residing in the memory 30 may be, for example, the Sun Solaris operating system, the IBM AIX operating system, or some other UNIX operating system. The operating system 32 includes a file system 36, which acts as a mapping layer 23 (FIG. 2) between application programs 34 and the logical volumes presented by the storage system 3 (FIG. 1). The file system 36 interprets each logical volume presented to it by the storage system 3 as a single logical device, also referred to as a raw storage device, which is assigned a unique identifier. In a Unix system, the file system 36 stores access privileges information for each of the logical volumes presented by the storage system 3 in a conventional manner as discussed above. Also residing in the memory 30 is a driver stack 38, which contains drivers for controlling access to external devices attached to the host computer 1, such as the storage system 3. For example, the driver stack may include a controller driver 46 for controlling access to the storage system 3, and a driver such as a SCSI disk driver 44 layered on top of the controller driver 46 for sending SCSI commands to the storage system 3 through a SCSI port (not shown) of the host computer 1.

In accordance with one embodiment of the present invention, the driver stack 38 also includes a security driver 42, preferably layered on top of the SCSI disk driver 44, for providing secure direct access to the logical volumes (raw devices) presented by the storage system 3. The driver stack 38 may also include other drivers 40. The stack can be implemented such that the order in which drivers are layered in the driver stack 38 determines the order in which a particular command will be processed. For example, when the driver stack 38 receives a command to open a raw device, the open command is processed sequentially by the other drivers 40, the security driver 42, the SCSI disk driver 44, and lastly by the controller driver 46.

The security driver 42 enables any application program 34 on the host computer 1 to directly access raw devices. For example, an application program 34 running on the host computer 1 may be a device browsing application program which enables a user of the host computer 1 to view the contents of a raw device on an output device such as a monitor 48c. The application program 34 may, for example, present the user with a list of unique device identifiers identifying one or more of the raw storage devices presented by the storage system 3. The user selects one of the device identifiers using an input device such as a keyboard 48a or a mouse 48b. In response, the application program 34 sends an "open file" command to the operating system 32 to open the raw storage device identified by the selected device identifier. An "open file" command which has a raw device identifier as an argument is used to open a raw device, rather than a file. If, for example, the application program is written in the C programming language, the "open file" command may be the fopen( ) command, and the file identifier argument of the fopen( ) command may be the selected device identifier. The "open file" command may contain the following information: (1) the identity of the application which sent the command, (2) the device to be opened, and (3) the purpose for which the device is to be opened (e.g., reading or writing). The operating system 32 can determine that the "open file" command is directed to a raw device rather than to a file, and therefore, can forward the "open file" command to the driver stack 38, rather than to the file system 36. An "open file" command directed to a raw device will be passed down the driver stack 38 to the security driver 42.

Figure 4:
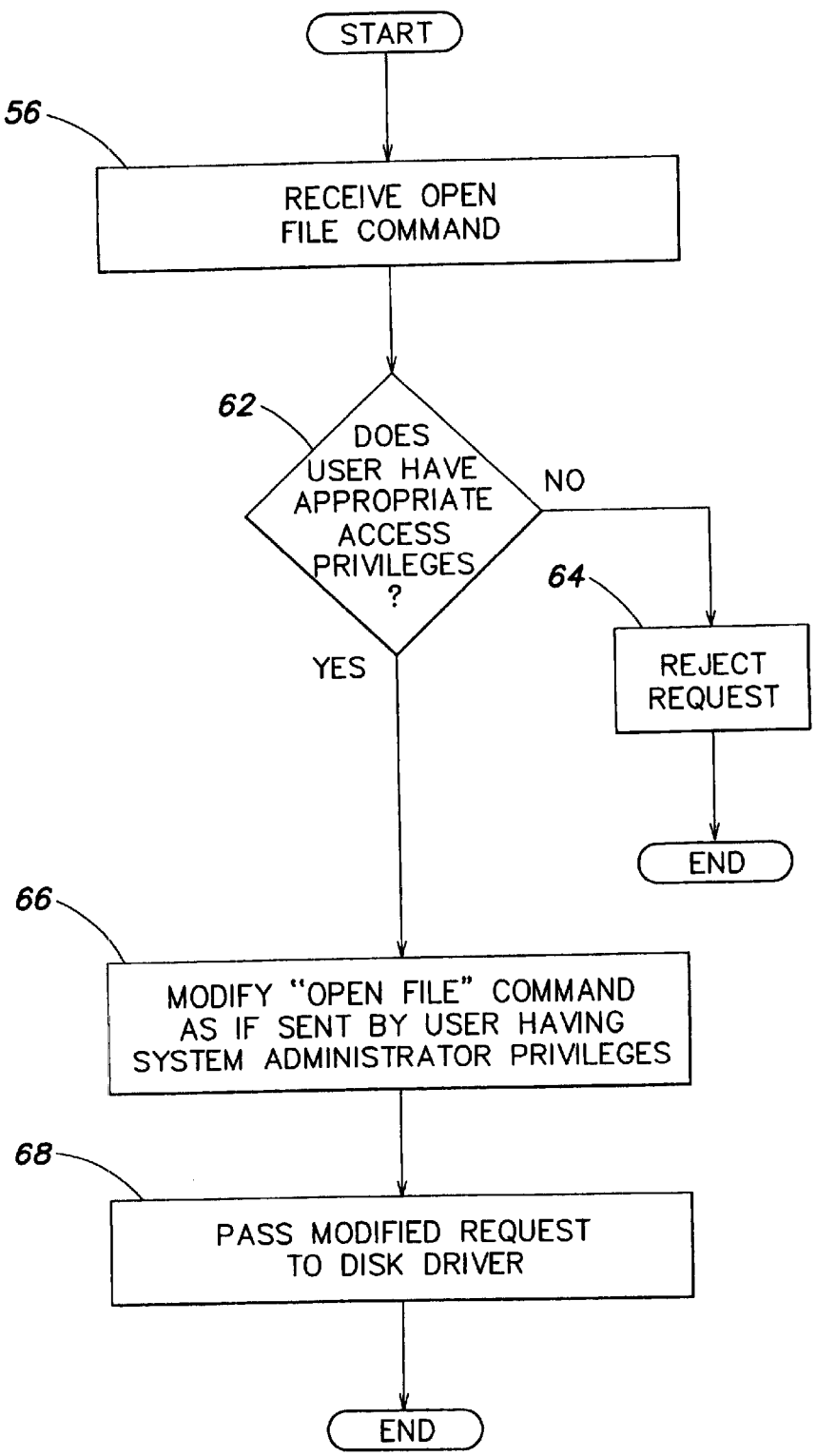
FIG. 4 is a flow chart of a method for providing controlled access to a raw storage device according to one embodiment of the present invention.

FIG. 4 is a flowchart illustrating an exemplary routine that the security driver 42 can execute to process an "open file" command directed to a raw device. The routine would be called when the "open file" command is passed (through the driver stack 38) to the security driver 42, and would be passed information relating to the identity of the application that issued the "open file" command and the raw device that the "open file" command seeks to open. It should be appreciated that the specific routine shown in FIG. 4 is provided merely for illustrative purposes, and that numerous alternate implementations are possible.

Referring to FIG. 4, the security driver 42 receives the "open file" command (step 56) and, in a manner discussed in connection with FIG. 5, checks the access privileges of the application making the request against the owner and access information associated with the raw storage device. As discussed above, in some operating systems, owner and access privileges information for raw storage devices is maintained and stored by the file system 36, and can be accessed by the security driver 42 using standard procedure calls to the operating system 32. When the user making the request does not have appropriate access privileges (decision step 62), the security driver 42 denies the request, signals an exception back to the maker of the request, and terminates processing of the command.

When the user making the request has appropriate access privileges (decision step 62), the security driver 42 modifies the "open file" request to indicate that the maker of the request is a user having system administrator privileges (step 66). The security driver 42 then passes the modified request down the driver stack 38 to the SCSI disk driver 44 (step 68) and terminates processing of the command. As in conventional systems, the SCSI disk driver 44 rejects all requests to open raw devices which are not received from a user having system administrator privileges. However, the SCSI disk driver 44 accepts the request as modified in step 66 because it appears to have originated from a user having system administrator privileges. Thus, a logical channel to the raw device is opened and the operating system 32 passes a device handle to the application program 34 for accessing the raw device. The application program 34 can subsequently access the raw device using the device handle.

Figure 5:
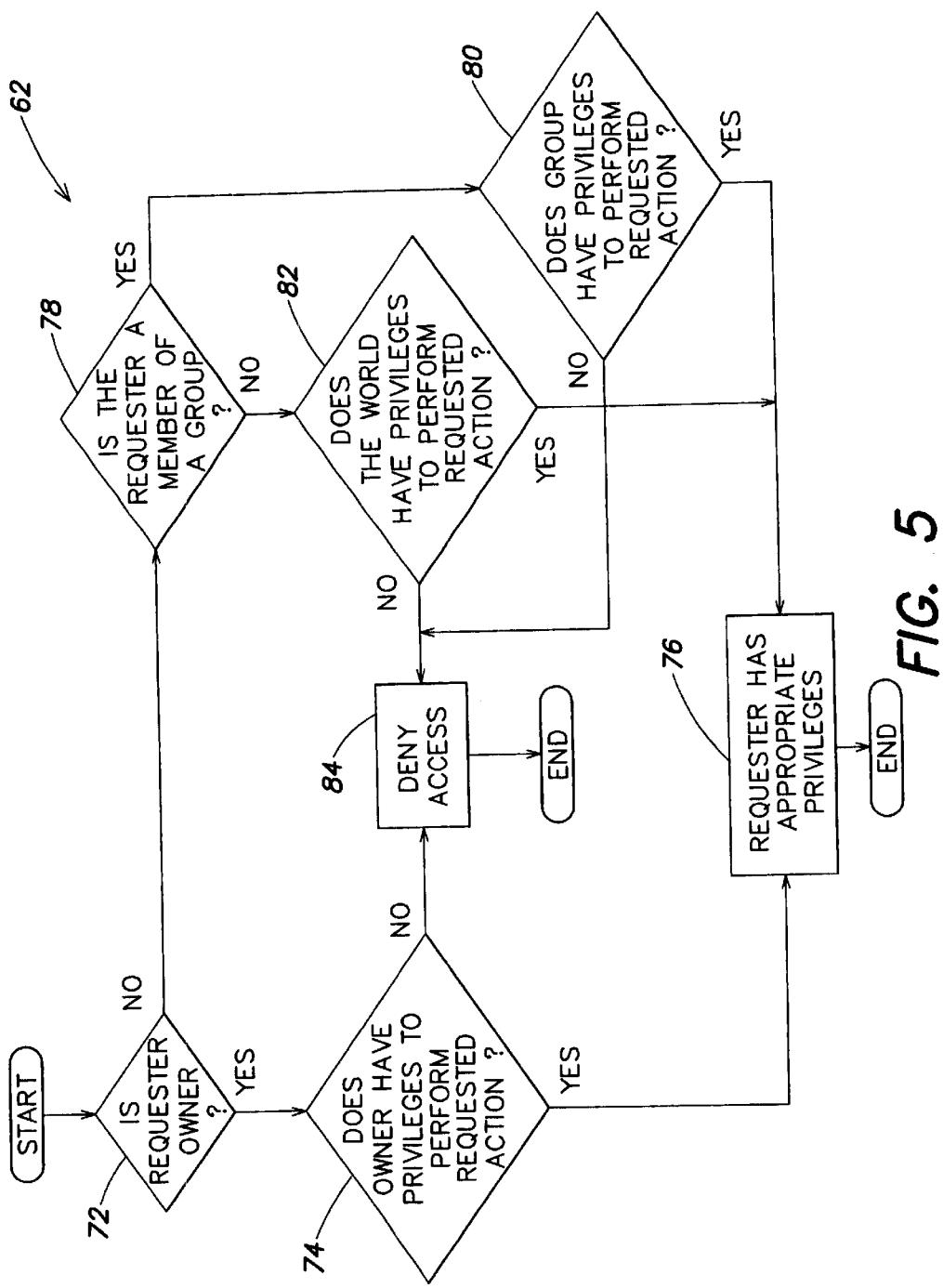
FIG. 5 is a flow chart of a method for determining whether a user or application is privileged to access a raw device according to one embodiment of the present invention.

FIG. 5 is one example of a routine that can be executed by the security driver 42 to determine whether the maker of the "open file" request has appropriate access privileges (e.g., step 62 of FIG. 4). When the maker of the request is the owner of the raw storage device (decision step 72), and when the owner of the raw storage device has appropriate access privileges to perform the action requested by the "open file" request (e.g., read access privileges in the case of a request to open a file for reading) (decision step 74), then the requester has appropriate access privileges (step 76), and this is signaled to the calling routine (e.g., step 62 in FIG. 4). When the maker of the request is the owner of the raw storage device (decision step 72), but the owner of the raw storage device does not have appropriate access privileges (decision step 74), the routine of FIG. 5 signals to its calling routine that the request is denied (step 84). When the maker of the request is not the owner of the raw storage device, control proceeds to decision step 78, wherein a determination is made as to whether the requester is a member of a group that has special access privileges to the raw storage device. When the requester is a member of such a group, and the group has privileges to perform the requested action (decision step 80), then the routine of FIG. 5 signals to its calling routine that the requester has access privileges to the raw storage device (step 76). When the maker of the request is a member of a group that has special access privileges to the raw storage device (decision step 78), but the group does not have appropriate access privileges (decision step 80), the routine of FIG. 5 signals to its calling routine that the request is denied (step 84). Finally, when the requester is not a member of a group that has special access privileges to the raw storage device (decision steps 78 and 80), then the requester's access privileges are compared to the world's access privileges. When the world has privileges to perform the requested action (decision step 82), then the routine indicates in step 76 that the requester has access privileges to the raw storage device. Otherwise, the requester does not have appropriate access privileges to the raw storage device, and the routine of FIG. 5 signals to its calling routine that the request is denied (step 84).

In the embodiments of the present invention described above in connection with FIGS. 3–5, the facility (e.g., the security driver 42) for verifying the access privileges for a request to a raw storage device is implemented in the driver stack 38, because that is the portion of the host computer 1 that certain types of operating systems (e.g., UNIX operating systems) employ to process requests to raw storage devices. However, not all operating systems handle accesses to a raw storage device in the same manner. For example, the Windows NT operating system passes requests to raw storage devices to the windows NT file system. In addition, Windows NT does not provide a mechanism for storing access privileges information for raw storage devices. Rather, under the Windows NT operating system, requests for access to a raw device are granted by the Windows NT file system if, and only if, the requesting application has system administrator privileges.

In view of the foregoing, an alternate embodiment of the present invention is implemented differently from that discussed above in connection with FIGS. 3–5, such that the aspects of the present invention relating to verifying the access privileges for requests to a raw storage device are not implemented in the driver stack 38. Rather, in an alternate embodiment of the present invention discussed in connection with FIGS. 6–7B, which is useful in connection with operating systems such as the Windows NT operating system wherein requests to a raw device are directed to the file system, a facility is implemented that intercepts all requests for access to a raw storage device before such requests make it to the file system. Thereafter, the facility, in a manner similar to that discussed above in connection with the security driver 42 (FIGS. 3–5), checks the access privileges for the request, and when the access privileges are satisfied, the security facility forwards the request to the file system. Significantly, the security facility is provided with system administrator privileges, such that all requests forwarded to the file system from the security facility to access a raw device will be granted.

Figure 6:
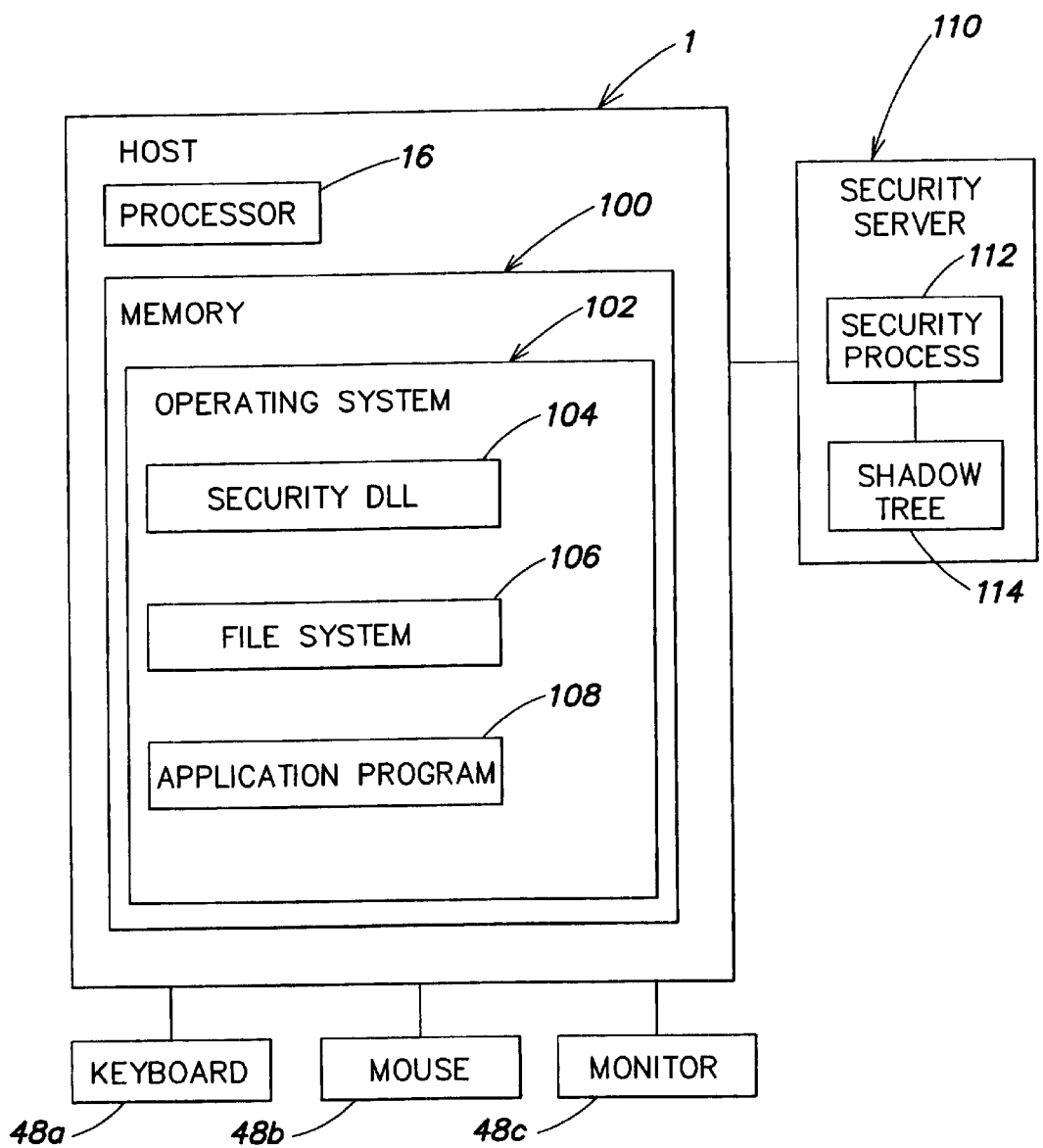
FIG. 6 is a block diagram of a computer system including a host containing a security dynamic link library for providing secure access to a computer system resource such as a storage device.

FIG. 6 illustrates a number of software components loaded onto a memory 100 in the host computer 1 (FIG. 1), wherein the software components include an operating system 102 such as the Windows NT operating system. The operating system 102 interprets each logical volume presented to it by the storage system 3 as a raw storage device, which is assigned a unique identifier. As mentioned, above the operating system 102 passes every request to a raw storage device to a file system 106, which grants access for such requests only for a user having system administrator privileges.

In accordance with one illustrative embodiment of the invention, a security dynamic link library (DLL) 104 is provided to control any direct access to a raw device. The security DLL can also make use of a security server 110 including a security process 112 and an associated shadow tree 114 in a manner described below. It should be appreciated that the security server 110 may be any computer, and that the security DLL 104 may communicate with the security server 110 through any type of communications path. For example, the host computer 1 and the security server 110 may both be computers on a network, in which case the security DLL 104 may communicate with the security process 112 using a network protocol such as TCP/IP. It should further be appreciated that the security DLL 104, the security process 112, and the shadow tree 114 may all reside on the same computer (e.g., the host computer 1), and that the security DLL, the security process, and the shadow tree 114 may be combined into a fewer (e.g., one) or greater number of components that collectively perform the same functions.

The following is an example of how an application may be provided with direct access to a raw device according to the embodiment of the invention shown in FIG. 6. An application program 108, such as a device browsing application program similar to that discussed above in connection with FIG. 3, running on the host computer 1 enables a user of the host computer 1 to view the contents of the logical volumes presented by the storage system 3 on an output device such as the monitor 48c. The application program 108 may, for example, present the user with a list of unique device identifiers identifying one or more of the logical volumes presented by the storage system 3. The user selects one of the device identifiers using an input device such as the keyboard 48a or the mouse 48b. The application program 108 sends an "open file" command, which may, for example, be the standard Windows NT open file command, to the file system 106. As discussed above, the security DLL 104 intercepts any command targeting a raw storage device that is sent from a user not having system administrator privileges to the file system 106. Thus, the security DLL 104 intercepts the "open file" command.

Figure 7A:
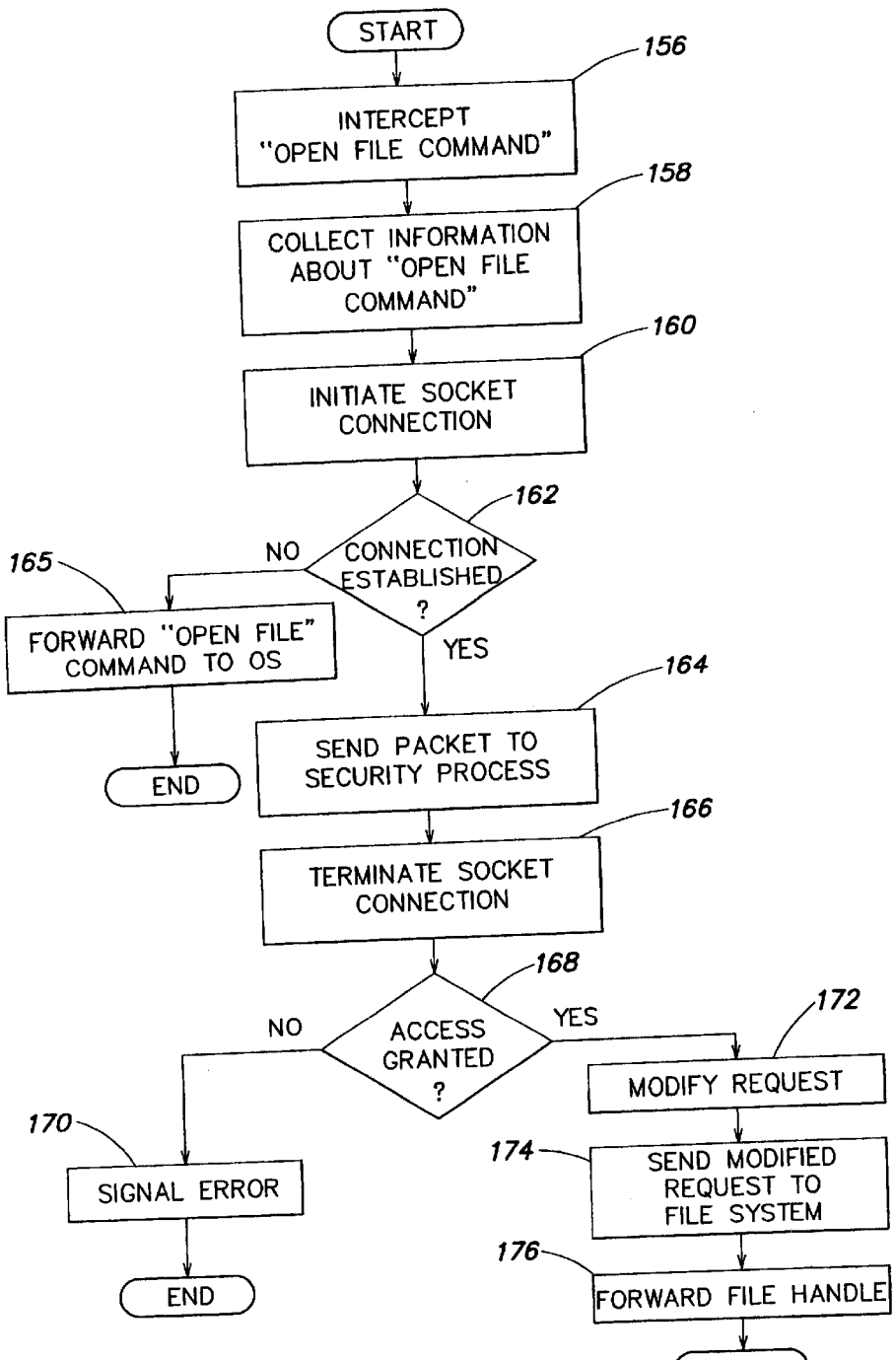
FIGS. 7A–7B are flow charts of methods for providing controlled access to a raw storage device according to an alternate embodiment of the present invention.

FIG. 7A is a flowchart illustrating an exemplary routine that the security DLL 104 can execute to process an "open file" command directed to a raw device. It should be appreciated that the specific routine shown in FIG. 7 is provided merely for illustrative purposes, and that numerous alternate implementations are possible. The routine would be called when the "open file" command is intercepted in transit from the application program 108 to the file system 106 as shown in step 156 in FIG. 7A. The security DLL 104 collects information related to the "open file" command, such as (1) the identity of the user making the request, (2) the identity of the application program making the request (in this example, the application program 108), (3) an identifier of the raw storage device that is the subject of the request, and (4) the kind of access that is being requested (e.g., read, write, or execute) (step 158). Such information may be obtained using standard Windows NT operating system routines.

In the particular implementation illustrated in FIG. 6, the security DLL 104 is assisted in the handling of accesses to a raw device by a security process 112 and a shadow tree 114 residing on a security server 110. It should be appreciated that the present invention is not limited in this respect, and that the functions performed by these different modules can be consolidated into a fewer number of modules, or alternatively, can be split up amongst a greater number of modules. In the particular implementation shown in FIG. 6, it is the security DLL 104 that is provided with system administrator privileges, such that when an access to a raw storage devices passes the security verification checks discussed below, it is the security DLL 104 that ultimately passes the command to the file system 106. It should be appreciated that when the DLL 104 and the security process 112 are coupled via a network, a network socket connection should be made to establish communication between the DLL 104 and the security process 112. Thus, in step 160 of FIG. 7A, the security DLL 104 attempts to initiate a network socket connection with the security process 112 (e.g., using a network protocol such as TCP/IP). When the security DLL 104 is unsuccessful in initiating communication with the security process 112, the security DLL 104 proceeds to step 165, wherein the security DLL 104 forwards the "open file"

command to the file system 106. The file system 106 will subsequently reject the request to open the raw storage device and signal an error to the application program 108 because the request originated from the application program 108, which does not have administrator privileges. Alternatively, the security DLL 104 could itself generate and send an appropriate error message to the application program 108 indicating that its request to open the raw storage device has been denied.

When the security DLL 104 is successful in establishing a network socket connection with the security process 112 (decision step 162), the security DLL 104 sends a packet containing the information collected in step 158 to the security process 112 using the network socket connection established in step 160. The security process 112 receives the packet, determines whether the "open file" request should be granted, and sends a response packet to the security DLL 104 indicating whether the "open file" request was granted or denied, as described in more detail below with respect to FIG. 7B. The security DLL 104 receives the response packet from the security process 112 and terminates the network socket connection to the security process 112 in step 166.

It should be appreciated that when the security DLL 104 and the security process 112 reside on the same computer (e.g., the host computer 1), steps 160 and 162 may not be necessary, and that communication between the security DLL, 104 and the security process 112 in steps 164 and 166 may be by means other than a network communications channel such as a network socket connection.

When the response packet received from the security process 112 in step 166 indicates that the access privileges requirements of the raw storage device are not satisfied, the security DLL 104 signals (step 170) an appropriate error message to the requesting application program 108, preferably in the same form as errors returned by the file system 106 (step 170). When the response packet received from the security process 112 in step 166 indicates that the access privileges requirements of the raw storage device ire satisfied, the security DLL 104 modifies the "open file" request to indicate that the "open file" request originated from the security DLL 104 (step 172), and opens the raw storage device by forwarding the modified "open file" command to the file system 106 (step 174). The file system 106 will grant the security DLL request because, as previously stated, the security DLL 104 has system administrator privileges. In response to the "open file" command, the file system 106 returns a file handle (providing access to the raw storage device) to the security DLL 104, the security DLL 104 sets any necessary status and error values, and forwards the file handle to the requesting application (step 176). In the Windows NT operating system, once the application program 108 has the file handle for the raw storage device, the application program 108 can use the file handle to perform operations on the file (e.g., read, writing, and closing), because the Windows NT file system only performs access privileges verification for "open file" commands and not for commands to perform operations on open files.

Figure 7B:
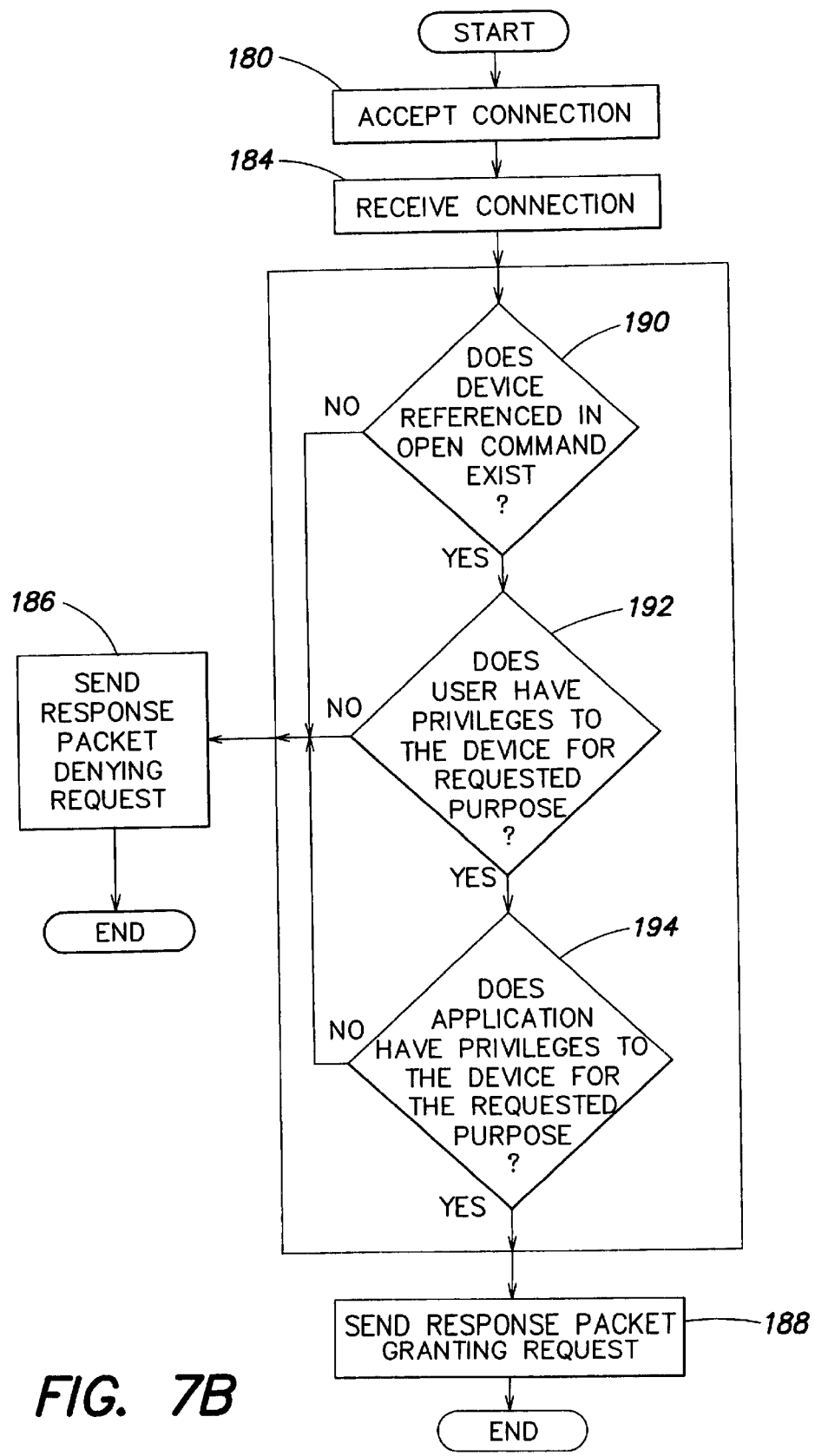

FIG. 7B is a flowchart illustrating an exemplary routine that the security process 112 can execute to process an "open file" command passed to it from the security DLL 104. It should be appreciated that the specific routine shown in FIG. 7B is provided merely for illustrative purposes, and that numerous alternate implementations are possible. The security process 112 accepts the network socket connection request sent by the security DLL in step 160 (step 180), and receives the packet of information sent by the security DLL in step 164 (step 182). In step 184, the security process 112 determines whether the access privileges requirements of the raw storage device referenced in the "open file" command are satisfied. This step can be performed in any of numerous ways. For example, in one embodiment of the present invention, the security server 110 maintains a shadow tree 114, which includes access privileges information for the logical volumes presented by the storage system 3. The security process 112 uses the shadow tree 114 to determine whether the "open file" request should be granted, as described in more detail below. The shadow tree 114 may, for example, be a list containing an entry for each of the logical volumes presented by the storage system 3, each entry including access privileges information of the kind described above for the raw storage device to which the entry corresponds.

The security process 112 determines whether the device referenced in the "open file" command exists by determining whether there is an entry in the shadow tree 114 corresponding to the raw storage device referenced in the "open file" request (step 190). When the device referenced in the "open file" command does not exist, the security process 112 sends a response packet to the security DLL indicating that the requested access to the raw storage device is denied (step 186). When the device exists, then the security process 112 determines whether the user who originated the "open file" request has access privileges to the referenced device for the requested purpose by examining the device's entry in the shadow tree (step 192). The security process 112 may, for example, determine whether the shadow tree entry indicates that the individual user has appropriate access privileges, whether the user is a member of a group that has appropriate access privileges, or whether the world has appropriate access privileges, in a manner similar to that discussed in connection with FIG. 5. When the user who originated the "open file" request does not have appropriate access privileges, the security process 112 sends a response packet to the security DLL indicating that the requested access to the raw storage device is denied (step 186).

When the user who originated the "open file" request has appropriate access privileges, then the security process 112 determines whether the application program that originated the "open file" request has access privileges to the referenced device for the requested purpose by examining the device's entry in the shadow tree (step 194). This step may be performed, for example, when the operating system 102 is Windows NT, which maintains distinct access privileges information for users and for applications. When the application that originated the "open file" request does not have appropriate access privileges, the security process 112 sends a response packet to the security DLL indicating that the requested access to the raw storage device is denied (step 186). Otherwise, the security process 112 sends a response packet to the security DLL indicating that the requested access to the raw storage device is granted (step 188).

In the illustrative implementation shown in FIG. 7B, separate privilege verification is performed for the user (step 192) and the application (step 194) to match the type of security verification normally done by the Windows NT operating system when accessing a raw device. In this respect, since the Windows NT operating system provides security privileges separately for a user and an application, in one embodiment of the present invention, the same security verification is performed by the security process 112. However, it should be appreciated that the present invention is not limited in this respect, and that for other types of operating systems, the security process 112 can mimic different types of security verification. In addition, although it is advantageous to have the security process 112 perform the same type of security verification normally performed by the operating system for accesses to a raw device, it should be appreciated that the present invention is not limited in this respect, and that a different type of security verification can be performed by the security process 112.

In the illustrative embodiment of the present invention discussed in connection with FIGS. 3–5, the security driver 42 is placed in the driver stack 38, because that is the location in many types of operating systems 32 (e.g., UNIX) which receives all requests to access a raw device. Similarly, in the embodiment of the invention shown in FIGS. 6–7B, the security DLL 104 is configured to intercept requests to the file system 106, because in other types of operating systems 102 (Windows NT), the file system 106 is the system component to which all accesses to a raw device are forwarded. However, it should be appreciated that the present invention is not limited in this respect, and that in other types of operating systems, a security facility that intercepts and performs access verification on requests to a raw device can be configured in other ways. In this respect, such a security facility can be provided anywhere, so long as it is provided in a path wherein it is capable of intercepting requests to a raw storage device. Furthermore, in several of the embodiments discussed above, a security facility is positioned so that it receives all requests to a raw device, even those issued from a system administrator. It should be appreciated that the present invention is not limited in this respect, since verification need not be done for the access privileges of a system administrator. Therefore, the security facility aspects of the present invention need not intercept requests to a raw device issued from a system administrator.

It should be understood that the present invention is not limited to use with any particular computer platform, particular processor, or particular high-level programming language. The aspects of the present invention discussed above (e.g., the security driver 42 of FIG. 3 and the security process 112 of FIG. 6) may be implemented in software, hardware, firmware, or a combination of the three. The various elements of the system, either individually or in combination, may be implemented as a computer program product tangibly embodied in a machine-readable storage device for execution by a computer processor such as the processor 16 shown in FIG. 1. Various steps of embodiments of the invention, such as those described above and illustrated using flow charts, may be performed by a computer processor executing a program (i.e., software or firmware) tangibly embodied on a computer-readable medium to perform functions by operating on input and generating output. The computer-readable medium may be a memory in the host computer 1 (FIG. 1), or a transportable medium such as a compact disk, a floppy disk, or a diskette, such that a computer program embodying the aspects of the present invention can be loaded onto any computer. The computer program is not limited to any particular embodiment, and may, for example, be an application program, foreground or background process, driver, or any combination thereof, executing on a single computer processor or multiple computer processors. Computer programming languages suitable for implementing such a system include procedural programming languages, object-oriented programming languages, and combinations of the two.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system including a host computer and a storage system that is coupled to the host computer and that stores data accessed by the host computer, the computer system including a plurality of logical volumes of data that are visible to the host computer and the storage system and are perceived by the host computer as comprising a plurality of raw storage devices, the host computer including a file system/LVM mapping layer, a method of managing access to one of the plurality of raw storage devices, the method comprising a step of:

(A) granting a request, from a requester having less than system administrator access privileges, to perform an action on the one of the plurality of raw storage devices, wherein the request bypasses the file system/LVM mapping layer.

2. The method of claim 1, wherein the one of the plurality of raw storage devices has associated access privileges information, and wherein the step (A) includes steps of:

verifying that the requester is privileged to perform the action on the one of the plurality of raw storage devices by comparing the access privileges information associated with the one of the plurality of raw storage devices with information descriptive of the requester; and granting the request when the access privileges information associated with the one of the plurality of raw storage devices indicates that the requester is privileged to perform the action on the one of the plurality of raw storage devices.

3. The method of claim 2, wherein the step of verifying includes a step of comparing the access privileges information associated with the one of the plurality of raw storage devices to information descriptive of the action to be performed on the one of the plurality of raw storage devices.

4. The method of claim 3, wherein the requester is a user of the computer system, such that the step (A) includes a step of granting the request from the user.

5. The method of claim 3, wherein the requester is an application program executing on the host computer, such that the step (A) includes a step of granting the request from the application program.

6. The method of claim 1, wherein the requester is a user of the computer system, such that the step (A) includes a step of granting the request from the user.

7. The method of claim 1, wherein the requester is an application program executing on the host computer, such that the step (A) includes a step of granting the request from the application program.

8. The method of claim 7, wherein the step (A) includes a step of granting the request from the application program in a manner that is transparent to the application program.

9. The method of claim 1, further including a step of:

(B) denying a request from the requester to perform a different action on the one of the plurality of raw storage devices.

10. The method of claim 1, wherein the storage system is an intelligent storage system that has a mapping layer that maps the plurality of logical volumes to physical storage devices within the storage system, so that the raw physical devices need not correspond in a 1:1 manner with the physical storage devices within the storage system.

11. A computer readable medium encoded with a program for execution on a host computer in a computer system including the host computer and a storage system that is coupled to the host computer and that stores data accessed by the host computer, the computer system further including a plurality of logical volumes of data that are visible to the host computer and the storage system and are perceived by the host computer as comprising a plurality of raw storage devices, the host computer including a file system/LVM mapping layer, the program, when executed on the host computer, performs a method of managing access to one of the plurality of raw storage devices, the method comprising a step of:

(A) granting a request, from a requester having less than system administrator access privileges, to perform an action on the one of the plurality of raw storage devices, wherein the request bypasses the file system/LVM mapping layer.

12. The computer readable medium of claim 11, wherein the one of the plurality of raw storage devices has associated access privileges information, and wherein the step (A) includes steps of:

verifying that the requester is privileged to perform the action on the one of the plurality of raw storage devices by comparing the access privileges information associated with the one of the plurality of raw storage devices with information descriptive of the requester; and granting the request when the access privileges information associated with the one of the plurality of raw storage devices indicates that the requester is privileged to perform the action on the one of the plurality of raw storage devices.

13. The computer readable medium of claim 12, wherein the step of verifying includes a step of comparing the access privileges information associated with the one of the plurality of raw storage devices to information descriptive of the action to be performed on the one of the plurality of raw storage devices.

14. The computer readable medium of claim 13, wherein the requester is a user of the computer system, such that the step (A) includes a step of granting the request from the user.

15. The computer readable medium of claim 13, wherein the requester is an application program executing on the host computer, such that the step (A) includes a step of granting the request from the application program.

16. The computer readable medium of claim 11, wherein the requester is a user of the computer system, such that the step (A) includes a step of granting the request from the user.

17. The computer readable medium of claim 11, wherein the requester is an application program executing on the host computer, such that the step (A) includes a step of granting the request from the application program.

18. The computer readable medium of claim 17, wherein the step (A) includes a step of granting the request from the application program in a manner that is transparent to the application program.

19. The computer readable medium of claim 11, further including a step of:

(B) denying a request from the requester to perform a different action on the one of the plurality of raw storage devices.

20. The computer readable medium of claim 11, wherein the storage system is an intelligent storage system that has a mapping layer that maps the plurality of logical volumes to physical storage devices within the storage system, so that the raw physical devices need not correspond in a 1:1 manner with the physical storage devices within the storage system.

21. A host computer for use in a computer system including the host computer and a storage system that is coupled to the host computer and that stores data accessed by the host computer, the computer system further including a plurality of logical volumes of data that are visible to the host computer and the storage system and are perceived by the host computer as comprising a plurality of raw storage devices, the host computer comprising:

a file system/LVM mapping layer;

a processor; and a memory programmed with an application program that has less than system administrator access privileges, the application program, when executed on the processor, having privileges to access at least one of the plurality of raw storage devices with an access request that bypasses the file system/LVM mapping layer.

22. The host computer of claim 21, wherein the application program has limited privileges to access the at least one of the plurality of raw storage devices, such that the application program can read but cannot write the at least one of the plurality of raw storage devices.

23. The host computer of claim 21, wherein the application program has privileges to access less than all of the plurality of raw storage devices.

24. A host computer for use in a computer system including the host computer and a storage system that is coupled to the host computer and that stores data accessed by the host computer, the computer system further including a plurality of logical volumes of data that are visible to the host computer and the storage system and are perceived by the host computer as comprising a plurality of raw storage devices, the host computer comprising:

a file system/LVM mapping layer; and at least one controller to manage access to the plurality of raw storage devices, wherein the at least one controller is adapted to grant a request, from a requester having less than system administrator access, to perform an action on one of the plurality of raw storage devices, wherein the request bypasses the file system/LVM mapping layer.

25. The host computer of claim 24, wherein the one of the plurality of raw storage devices has associated access privileges information, and wherein the at least one controller is adapted to verify that the requester is privileged to perform the action on the one of the plurality of raw storage devices by comparing the access privileges information associated with the one of the plurality of raw storage devices with information descriptive of the requester.

26. The host computer of claim 25, wherein the at least one controller is adapted to compare the access privileges information associated with the one of the plurality of raw storage devices to information descriptive of the action to be performed on the one of the plurality of raw storage devices.

27. The host computer of claim 24, wherein the at least one controller is adapted to grant requests for access to the plurality of raw storage devices from users of the computer system having less than system administrator privileges.

28. The host computer of claim 24, wherein the at least one controller is adapted to grant requests for access to the plurality of raw storage devices from application programs executing on the host computer with less than system administrator privileges.

29. The host computer of claim 24, wherein the at least one controller is adapted to grant a request for access to the plurality of raw storage devices from an application program, having less than system administrator privileges, executing on the host computer in a manner that is transparent to the application program.

30. The host computer of claim 24, wherein the at least one controller is adapted to provide a requester with limited access to one of the plurality of raw storage devices, such that the at least one controller may provide a particular requester will access to perform some type of actions but not others on the one of the plurality of raw storage devices.

31. The host computer of claim 24, wherein the storage system is an intelligent storage system that has a mapping layer that maps the plurality of logical volumes to physical storage devices within the storage system, so that the raw physical devices need not correspond in a 1:1 manner with the physical storage devices within the storage system.

32. In a computer system including a host computer and a storage system that is coupled to the host computer and that stores data accessed by the host computer, the computer system including a plurality of logical volumes of data that are visible to the host computer and the storage system and are perceived by the host computer as comprising a plurality of raw storage devices, the host computer comprising a file system/LVM mapping layer, a method of responding to a request from a requester to perform an action on one of the plurality of raw storage devices, wherein the request bypasses the file system/LVM mapping layer, and wherein the one of the plurality of raw storage devices has associated access privileges information, the method comprising steps of:

(A) determining whether the requester is privileged to perform the action on the one of the plurality of raw storage devices by comparing the access privileges information associated with the one of the plurality of raw storage devices with information descriptive of the requester;

(B) granting the request to perform the action on the one of the plurality of raw storage devices when it is determined in the step (A) that the requester is privileged to perform the action; and (C) denying the request to perform the action on the one of the plurality of raw storage devices when it is determined in the step (A) that the requester is not privileged to perform the action.

33. The method of claim 32, wherein the step (A) includes a step of comparing the access privileges information associated with the one of the plurality of raw storage devices to information descriptive of the action to be performed on the one of the plurality of raw storage devices.

34. The method of claim 32, wherein the requester is a user of the computer system.

35. The method of claim 32, wherein the requester is an application program executing on the host computer.

36. A computer readable medium encoded with a program for execution on a host computer in a computer system including the host computer and a storage system that is coupled to the host computer and that stores data accessed by the host computer, the computer system including a plurality of logical volumes of data that are visible to the host computer and the storage system and are perceived by the host computer as comprising a plurality of raw storage devices, the host computer comprising a file system/LVM mapping layer, the program, when executed on the host computer, performing a method of responding to a request from a requester to perform an action on one of the plurality of raw storage devices, wherein the request bypasses the file system/LVM mapping layer, and wherein the one of the plurality of raw storage devices has associated access privileges information, the method comprising steps of:

(A) determining whether the requester is privileged to perform the action on the one of the plurality of raw storage devices by comparing the access privileges information associated with the one of the plurality of raw storage devices with information descriptive of the requester;

(B) granting the request to perform the action on the one of the plurality of raw storage devices when it is determined in the step (A) that the requester is privileged to perform the action; and (C) denying the request to perform the action on the one of the plurality of raw storage devices when it is determined in the step (A) that the requester is not privileged to perform the action.

37. The computer readable medium of claim 36, wherein the step (A) includes a step of comparing the access privileges information associated with the one of the plurality of raw storage devices to information descriptive of the action to be performed on the one of the plurality of raw storage devices.

38. The computer readable medium of claim 36, wherein the requester is a user of the computer system.

39. The computer readable medium of claim 36, wherein the requester is an application program executing on the host computer.

40. A host computer for use in a computer system including the host computer and a storage system that is coupled to the host computer and that stores data accessed by the host computer, the computer system including a plurality of logical volumes of data that are visible to the host computer and the storage system and are perceived by the host computer as comprising a plurality of raw storage devices, wherein at least one of the plurality of raw storage devices has associated access privileges information, the host computer comprising:

a file system/LVM mapping layer; and at least one controller to respond to requests from requesters to perform actions on one of the plurality of raw storage devices, wherein the requests bypass the file system/LVM mapping layer, wherein the at least one controller is, for each one of the requests, adapted:

to determine whether the requester is privileged to perform the action on the one of the plurality of raw storage devices by comparing the access privileges information associated with the one of the plurality of raw storage devices with information descriptive of the requester;

to grant the request to perform the action on the one of the plurality of raw storage devices when it is determined that the requester is privileged to perform the action; and to deny the request to perform the action on the one of the plurality of raw storage devices when it is determined that the requester is not privileged to perform the action.

41. The host computer of claim 40, wherein the at least one controller is, for each request, adapted to compare the access privileges information associated with the one of the plurality of raw storage devices to information descriptive of the action to be performed on the one of the plurality of raw storage devices.

42. The host computer of claim 40, wherein the at least one controller is adapted to respond to requests for access to the plurality of raw storage devices from users of the computer system.

43. The host computer of claim 40, wherein the at least one controller is adapted to respond to requests for access to the plurality of raw storage devices from application programs executing on the host computer.

44. In a computer system including a host computer and a storage system that is coupled to the host computer and that stores data accessed by the host computer, the computer system including a plurality of logical volumes of data that are visible to the host computer and the storage system and are perceived by the host computer as comprising a plurality of raw storage devices, the host computer having an access facility that grants access to the plurality of raw storage devices and requires a minimum privilege level for a requester to be granted access to one of the plurality of raw storage devices, a method of managing access to the plurality of raw storage devices, the method comprising steps of:

(A) intercepting requests to access one of the plurality of raw storage devices from requesters that do not satisfy the minimum privilege level required by the access facility to grant access to one of the plurality of raw storage devices; and (B) modifying at least some of the requests intercepted in the step (A) to indicate that the requester satisfies the minimum privilege level to be granted access to one of the plurality of raw storage devices.

45. The method of claim 44, wherein the minimum privilege level for a requester to be granted access one of the plurality of raw storage devices is system administrator privileges;

wherein the step (A) includes a step of intercepting requests to access one of the plurality of raw storage devices from requesters that do not have system administrator privileges; and wherein the step (B) includes a step of modifying at least some of the requests intercepted in the step (A) to indicate that the requester has system administrator privileges.

46. The method of claim 44, wherein at least some of the plurality of raw storage devices have associated access privileges information that establishes a privilege level less than the minimum privilege level imposed by the access facility, wherein each request for access to one of the plurality of raw storage devices includes a requester, a target raw storage device and a requested action for performance on the target raw storage device, and wherein the step (B) includes, for each request intercepted in the step (A), steps of:

determining whether the requester is privileged to perform the requested action on the target raw storage device by comparing the access privileges information associated with the target raw storage device with information descriptive of the requester; and modifying the request when the access privileges information associated with the target raw storage device indicates that the requester is privileged to perform the requested action on the target raw storage device.

47. The method of claim 46, wherein, for each request intercepted in the step (A), the step (B) includes a step of passing along the request without modifying the access privileges associated therewith when it is determined that the requester is not privileged to perform the requested action on the target raw storage device.

48. The method of claim 46, wherein the step of determining includes a step of comparing the access privileges information associated with the target raw storage device to information descriptive of the requested action to be performed on the target raw storage device.

49. The method of claim 44, wherein the step (A) includes a step of intercepting requests from a user of the host computer.

50. The method of claim 44, wherein the step (A) includes a step of intercepting requests from application programs executing on the host computer.

51. The method of claim 50, wherein the step (A) and the step (B) are performed in a manner that is transparent to the application program.

52. A computer readable medium encoded with a program for execution on a host computer in a computer system including the host computer and a storage system that is coupled to the host computer and that stores data accessed by the host computer, the computer system including a plurality of logical volumes of data that are visible to the host computer and the storage system and are perceived by the host computer as comprising a plurality of raw storage devices, the host computer having an access facility that grants access to the plurality of raw storage devices and requires a minimum privilege level for a requester to be granted access to one of the plurality of raw storage devices, the program, when executed on the host computer, performs a method of managing access to the plurality of raw storage devices, the method comprising steps of:

(A) intercepting requests to access one of the plurality of raw storage devices from requesters that do not satisfy the minimum privilege level required by the access facility to grant access to one of the plurality of raw storage devices; and (B) modifying at least some of the requests intercepted in the step (A) to indicate that the requester satisfies the minimum privilege level to be granted access to one of the plurality of raw storage devices.

53. The computer readable medium of claim 52, wherein the minimum privilege level for a requester to be granted access one of the plurality of raw storage devices is system administrator privileges;

wherein the step (A) includes a step of intercepting requests to access one of the plurality of raw storage devices from requesters that do not have system administrator privileges; and wherein the step (B) includes a step of modifying at least some of the requests intercepted in the step (A) to indicate that the requester has system administrator privileges.

54. The computer readable medium of claim 52, wherein at least some of the plurality of raw storage devices have associated access privileges information that establishes a privilege level less than the minimum privilege level imposed by the access facility, wherein each request for access to one of the plurality of raw storage devices includes a requester, a target raw storage device and a requested action for performance on the target raw storage device, and wherein the step (B) includes, for each request intercepted in the step (A), steps of:

determining whether the requester is privileged to perform the requested action on the target raw storage device by comparing the access privileges information associated with the target raw storage device with information descriptive of the requester; and modifying the request when the access privileges information associated with the target raw storage device indicates that the requester is privileged to perform the requested action on the target raw storage device.

55. The computer readable medium of claim 54, wherein, for each request intercepted in the step (A), the step (B)

includes a step of passing along the request without modifying the access privileges associated therewith when it is determined that the requester is not privileged to perform the requested action on the target raw storage device.

56. The computer readable medium of claim 54, wherein the step of determining includes a step of comparing the access privileges information associated with the target raw storage device to information descriptive of the requested action to be performed on the target raw storage device.

57. The computer readable medium of claim 52, wherein the step (A) includes a step of intercepting requests from a user of the host computer.

58. The computer readable medium of claim 52, wherein the step (A) includes a step of intercepting requests from application programs executing on the host computer.

59. The computer readable medium of claim 58, wherein the step (A) and the step (B) are performed in a manner that is transparent to the application program.

60. A host computer for use in a computer system including the host computer and a storage system that is coupled to the host computer and that stores data accessed by the host computer, the computer system including a plurality of logical volumes of data that are visible to the host computer and the storage system and are perceived by the host computer as comprising a plurality of raw storage devices, the host computer comprising:
    an access facility that grants access to the plurality of raw storage devices and requires a minimum privilege level for a requester to be granted access to one of the plurality of raw storage devices; and
    at least one controller that:
        intercepts requests to access one of the plurality of raw storage devices from requesters that do not satisfy the minimum privilege level required by the access facility to grant access to one of the plurality of raw storage devices; and
        modifies at least some of the intercepted requests to indicate that the requester satisfies the minimum privilege level to be granted access to one of the plurality of raw storage devices.

61. The host computer of claim 60, wherein the minimum privilege level for a requester to be granted access one of the plurality of raw storage devices is system administrator privileges.

62. The host computer of claim 60, wherein at least some of the plurality of raw storage devices have associated access privileges information that establishes a privilege level less than the minimum privilege level imposed by the access facility, wherein each request for access to one of the plurality of raw storage devices includes a requester, a target raw storage device and a requested action for performance on the target raw storage device, and wherein for each intercepted request, the controller:
    determines whether the requester is privileged to perform the requested action on the target raw storage device by comparing the access privileges information associated with the target raw storage device with information descriptive of the requester; and
    modifies the request when the access privileges information associated with the target raw storage device indicates that the requester is privileged to perform the requested action on the target raw storage device.

63. The host computer of claim 62, wherein, for each intercepted request, the at least one controller passes along the request without modifying the access privileges associated therewith when it is determined that the requester is not privileged to perform the requested action on the target raw storage device.

64. The host computer of claim 62, wherein the at least one controller compares the access privileges information associated with the target raw storage device to information descriptive of the requested action to be performed on the target raw storage device.

65. The host computer of claim 60, wherein the at least one controller intercepts requests from a user of the host computer.

66. The host computer of claim 60, wherein the at least one controller intercepts requests from application programs executing on the host computer.

* * * * *